United States Patent [19]

Tsung

[11] Patent Number: 5,409,603
[45] Date of Patent: Apr. 25, 1995

[54] ADDITIONAL TROUGH FOR AN AQUARIUM FILTER CONTAINER

[76] Inventor: Chiang M. Tsung, P.O. Box 82-144, Taipei, Taiwan, Prov. of China

[21] Appl. No.: 218,929

[22] Filed: Mar. 28, 1994

Related U.S. Application Data

[63] Continuation-in-part of Ser. No. 120,774, Sep. 15, 1993, abandoned.

[51] Int. Cl.⁶ .............................................. A01K 63/04
[52] U.S. Cl. .................................... 210/169; 210/282; 210/283; 210/284; 210/233; 210/255; 210/261; 210/473; 206/503; 119/259
[58] Field of Search ............... 206/503, 504; 210/169, 210/232, 233, 237, 238, 248, 252, 255, 253, 261, 264, 266, 282, 283, 284, 473, 416.2; 119/259, 260, 261

[56] References Cited

U.S. PATENT DOCUMENTS

| | | |
|---|---|---|
| 3,369,659 | 2/1968 | Ettlinger, Jr. ............. 206/503 |
| 3,468,288 | 9/1969 | Cassil ....................... 210/169 |
| 3,768,651 | 10/1973 | Streeter ................... 210/169 |
| 3,768,652 | 10/1973 | Jardim ...................... 210/169 |
| 3,848,567 | 11/1974 | Garber, Jr. ............... 210/169 |
| 3,994,807 | 11/1976 | Macklem ................... 210/169 |
| 4,155,451 | 5/1979 | Miller ....................... 206/503 |
| 4,728,504 | 3/1988 | Nichols ..................... 206/504 |
| 4,760,921 | 8/1988 | Licari ........................ 260/504 |
| 5,026,477 | 6/1991 | Yen .......................... 210/169 |

FOREIGN PATENT DOCUMENTS

| | | |
|---|---|---|
| 2222505 | 11/1973 | Germany . |
| 3638239 | 5/1988 | Germany . |
| 1-288395A | 11/1989 | Japan . |
| 2-268629A | 11/1990 | Japan . |
| 2215229 | 9/1989 | United Kingdom . |
| 2248558 | 4/1992 | United Kingdom . |

*Primary Examiner*—Robert A. Dawson
*Assistant Examiner*—Robert James Popovics
*Attorney, Agent, or Firm*—Alfred Lei

[57] ABSTRACT

An additional trough for an aquarium filter container comprising a rectangular body having an open top and consisting of a bottom panel, two long-side panels and two short-side panels, said bottom panel being formed with a plurality of equidistant longitudinal and transverse grooves making a plurality of intersecting points, a perforation being formed on alternate one of said intersecting points and equally distant from each other, said bottom panel further having at the outer side a protruded portion which is smaller than the open top of said rectangular body in area and extends outwardly to a flange and downwardly to form four elongated projections, said bottom panel having an outer side formed with a plurality of annular portions concentric with corresponding perforations.

5 Claims, 8 Drawing Sheets

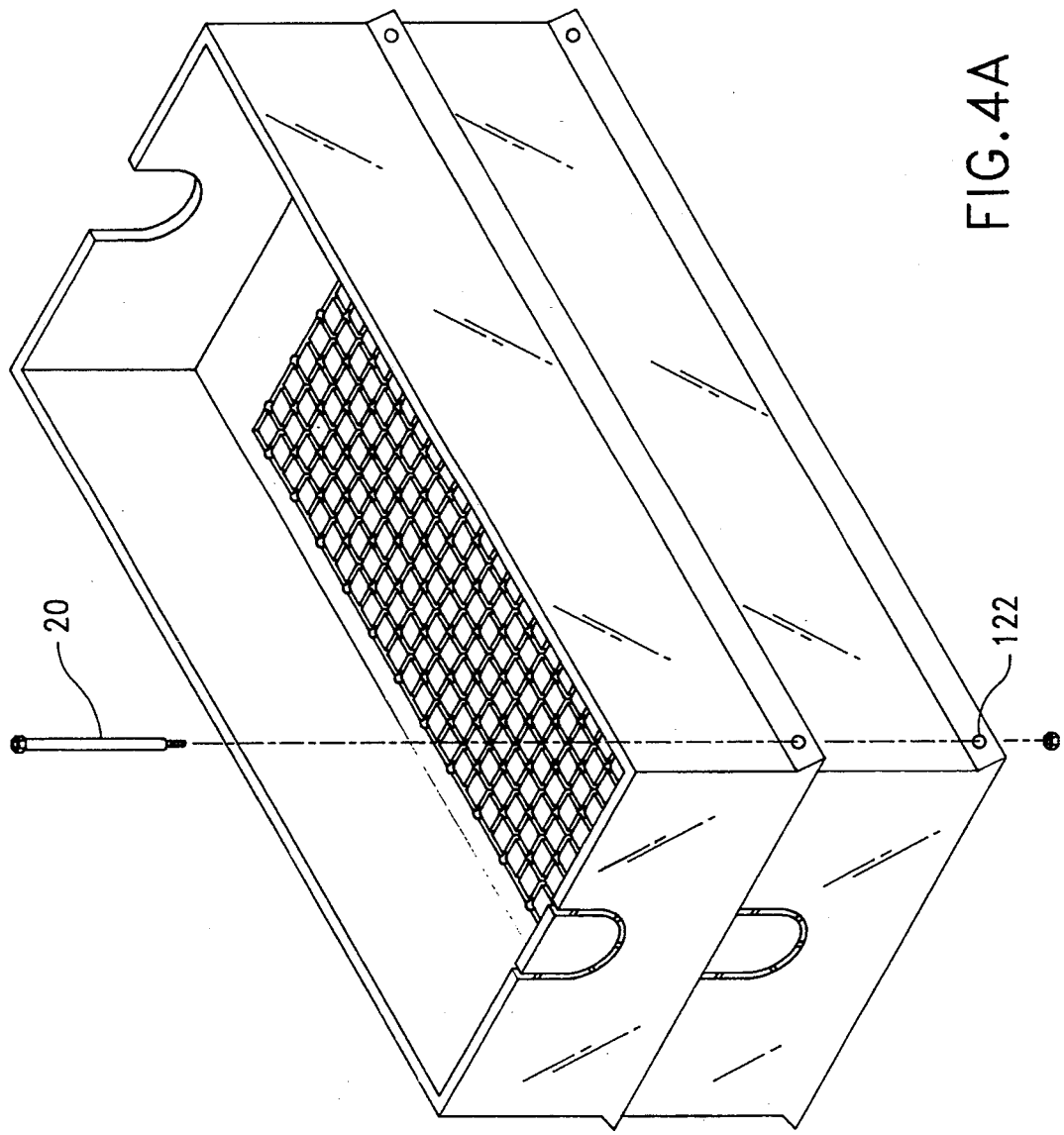
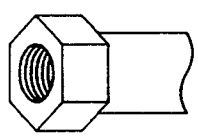

ADDITIONAL TROUGH FOR AN AQUARIUM FILTER CONTAINER

CROSS-REFERENCE

This application is a continuation-in-part of the former patent application serial No. 08/120,774, filed Sep. 15, 1993 now abandoned.

BACKGROUND OF THE INVENTION

Good aquariums are far more complicated than a glass bowl, some water, and a goldfish: they are miniature lakes or oceans in which all complex processes of underwater life take place. An important factor in the success of an aquarium is the elimination of wastes. Like all other animals, fish excrete wastes that, if not removed, pollute the water and threaten the survival of the fish. In addition, when wastes are not cleaned up, microscopic floating plants called algae, which live on wastes, have so much food that the aquarium is soon choked with them, a phenomenon called green water. A common solution to this problem involves using a filter in conjunction with the bubbler. However, the conventional filter container is simply a casing for receiving filtering material and the water flows through the casing so quickly that it is unfit for the survival of germs which can remove the harmful gases such as ammonia and neon in the water.

Therefore, it is an object of the present invention to provide a filter container which can obviate and mitigate the above-mentioned drawbacks.

SUMMARY OF THE INVENTION

This invention relates to an additional trough for an aquarium filter container.

It is the primary object of the present invention to provide an additional trough which may be easily mounted on an aquarium filter container.

It is another object of the present invention to provide an additional trough for an aquarium filter container which is fit for the survival of germs.

It is still another object of the present invention to provide an additional trough for an aquarium filter container which can be piled on the top of the other.

It is still another object of the present invention to provide an additional trough for an aquarium filter container which is simple in construction.

It is a further object f the present invention to provide an additional trough for an aquarium filter container which is low in cost.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 4A is a perspective view showing the connection of two additional troughs according to the present invention;

FIG. 4B is an enlarged view of the upper end of the stud;

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description.

Figure 1:
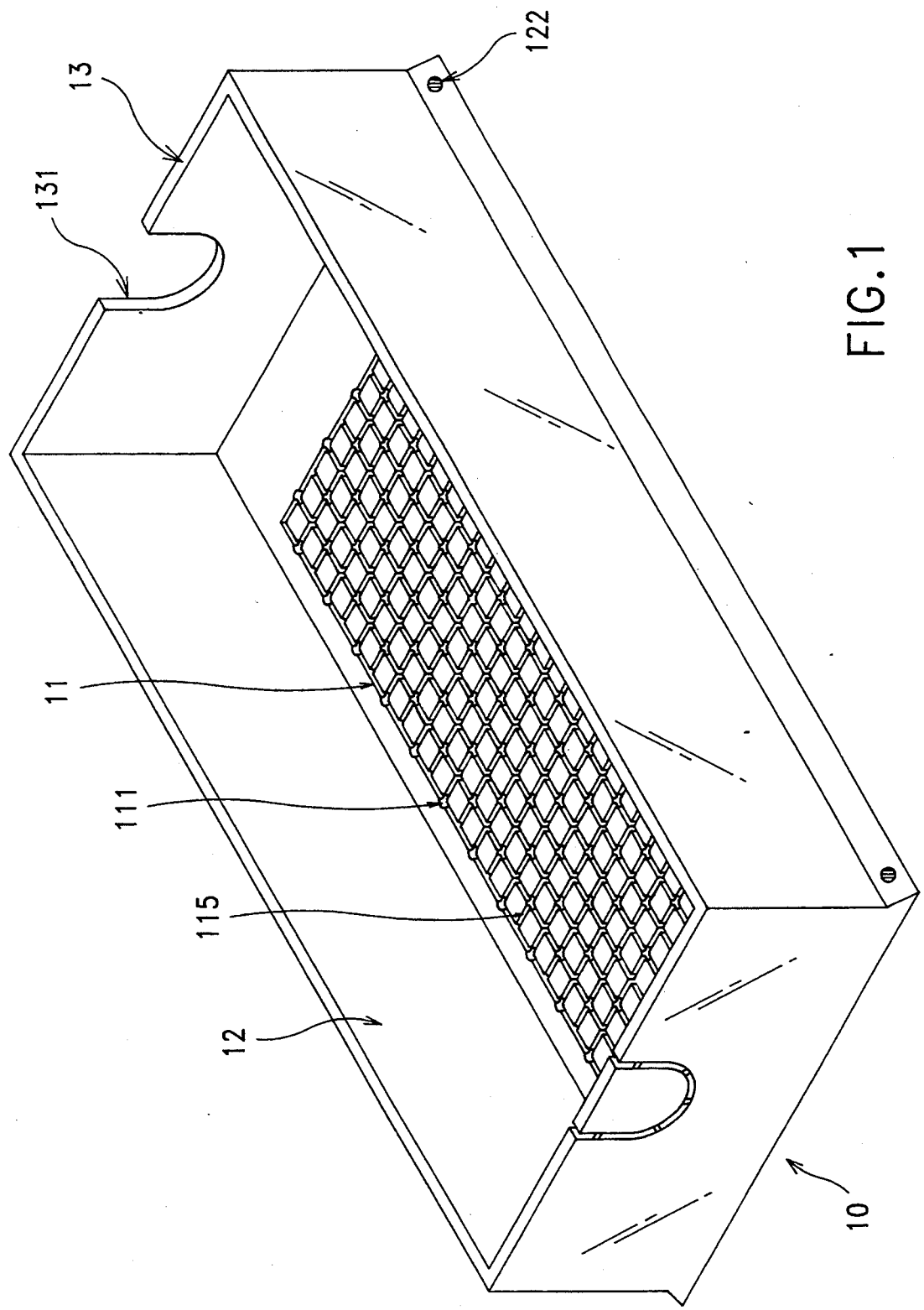
FIG. 1 is a top perspective view of the present invention.
Figure 2:
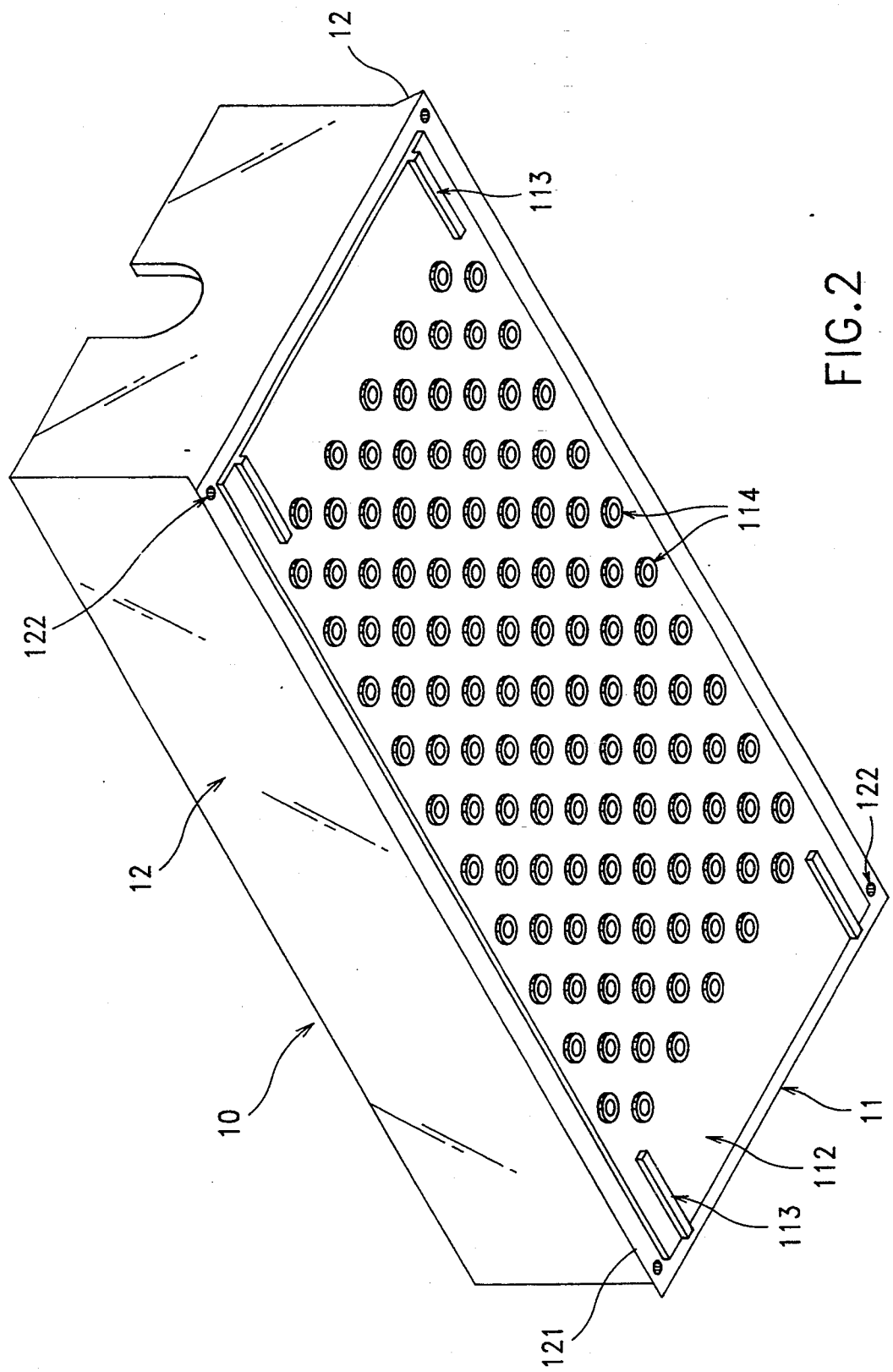
FIG. 2 is a bottom perspective view of the present invention.

Referring now to the drawings and more particularly to FIGS. 1 and 2 thereof, the additional trough for an aquarium filter container according to the present invention comprises a rectangular body 10 which has an open top and consists of a bottom panel 11, two long-side panels 12, and two short-side panels 13. The bottom panel 11 is formed with a plurality of equidistant longitudinal and transverse grooves 115 making a plurality of intersecting points. A perforation 111 is formed on alternate intersecting point and equally distant from each other. The lower side of the bottom panel 11 is formed with a protruded portion 112 which is smaller than the open top of the rectangular body 10 in area. The protruded portion 112 extends outwardly to form a flange 121 and downwardly to form four elongated projections 113. The intermediate portion of the upper side of the short-side panel 13 has a curved notch 131 engaged with a tab 132 which can be easily removed by applying force thereon.

Figure 3:
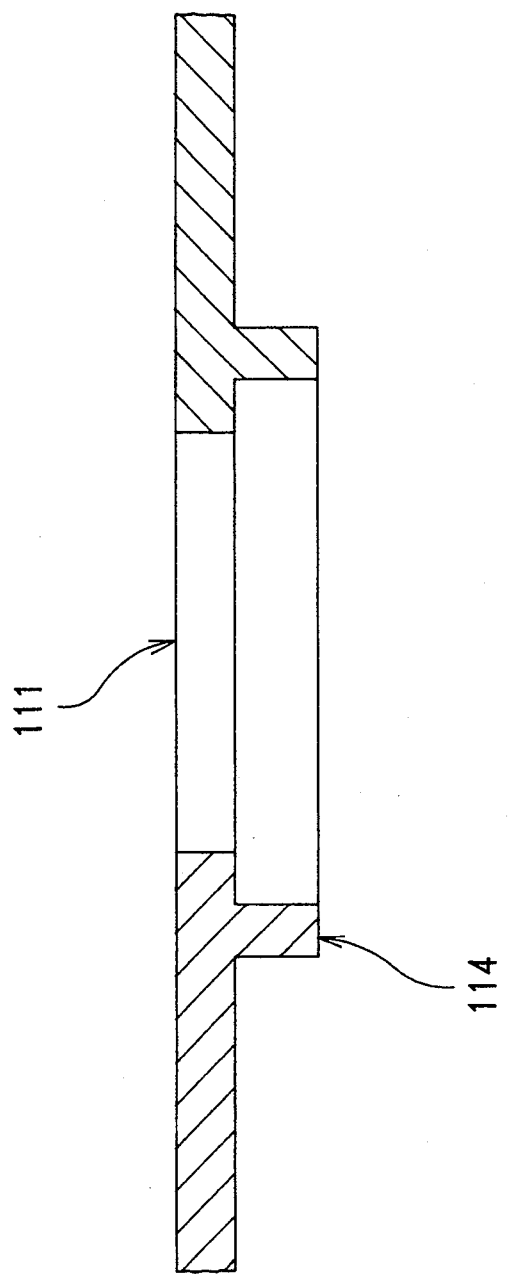
FIG. 3 is a fragmentary sectional view of the present invention.

As shown in FIG. 3, each perforation 111 of the bottom panel 11 has a diameter of 3 mm and a depth of 0.75 mm. The sizes are the most ideal specification obtained by numerous experiments so that the water will flow therethrough too slowly or too fast. Further, the outer side of the bottom panel 11 is formed with a plurality of annular portions 114 concentric with corresponding perforations 111 thereby preventing the water dropping out of the perforations 111 from converging and therefore ensuring the water to drop down smoothly out of the perforations 111.

Figure 4C:
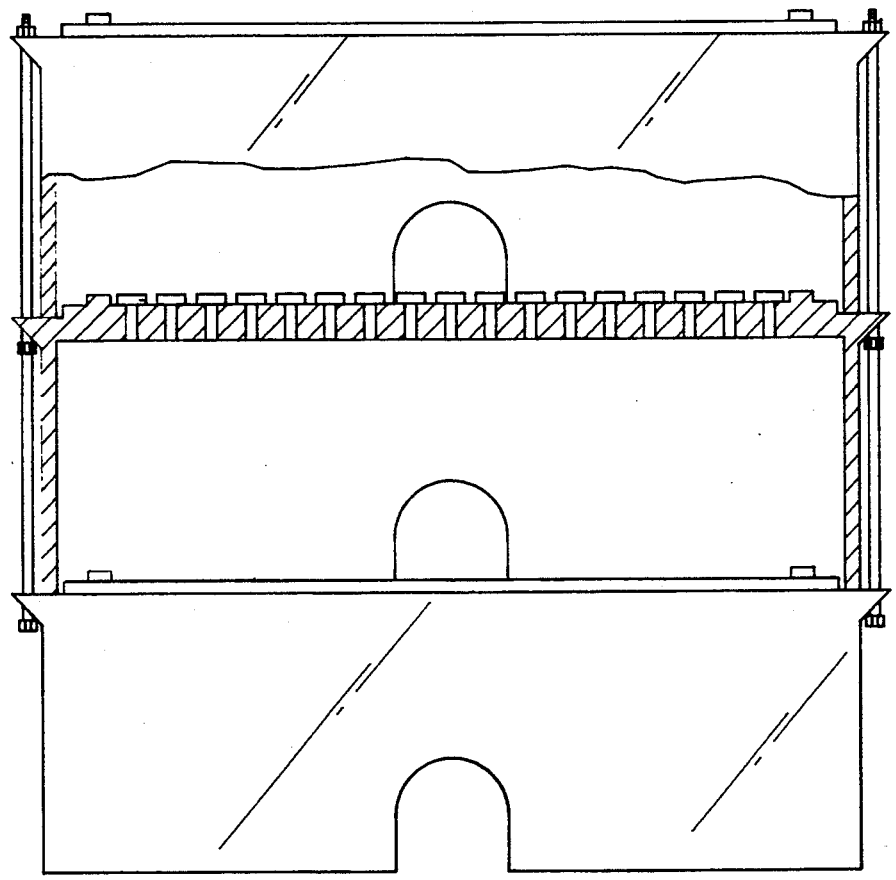
FIG. 4C is a side view showing the connection of three additional troughs according to the present invention.

As the protruded portion 12 is smaller than the open top of the body portion 10 in area, an additional trough can be firmly piled on the top of the other. In addition, the additional troughs may be fixedly kept in place by inserting studs 20 through the holes 122 of the additional troughs to engage nuts (see FIGS. 4A, 4B and 4C).

Figure 7:
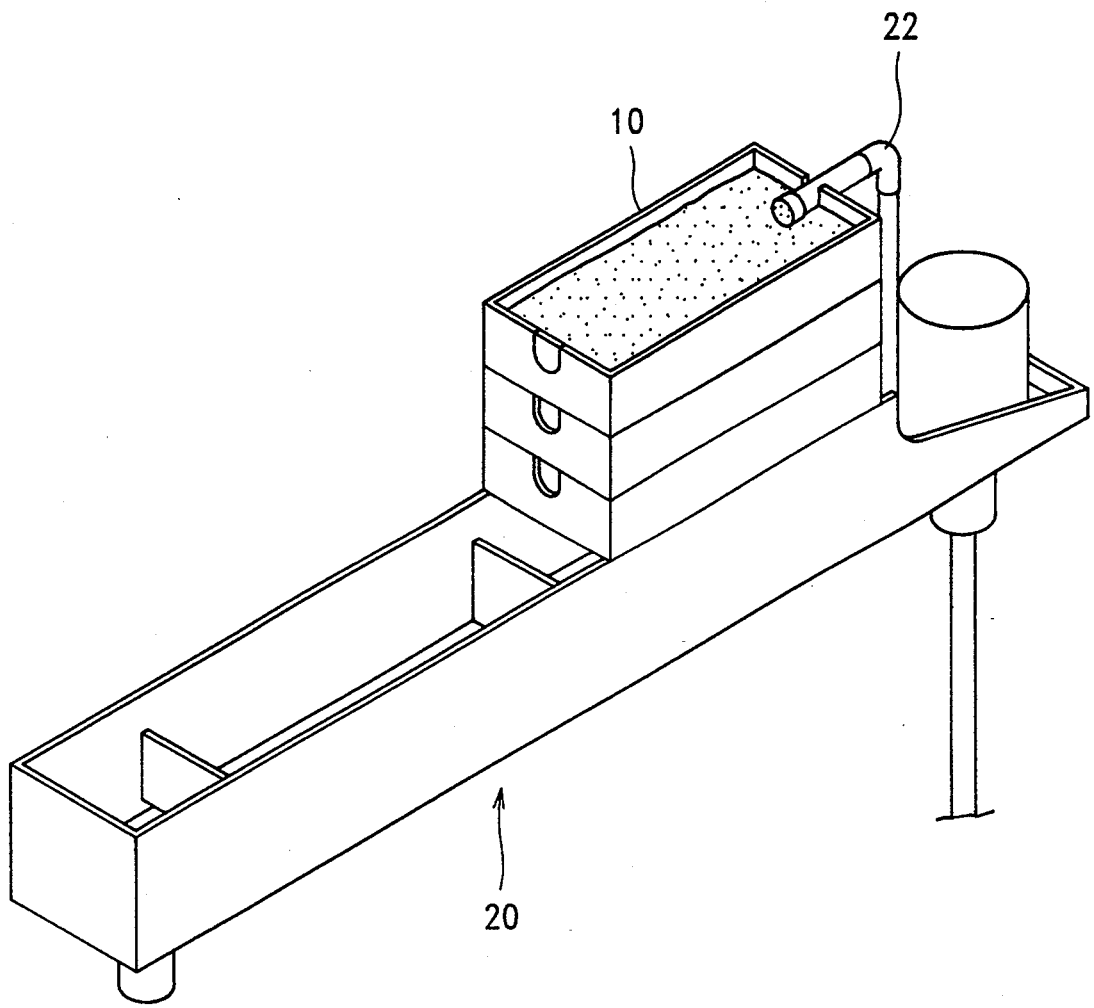
FIG. 7 illustrates the way to apply the additional trough to an aquarium filter container.

When in use, first mount a number of additional troughs on an aquarium filter container 20 and then dispose a water outlet 22 of a filter on the top of the uppermost additional trough 10 (see FIG. 7). In case when the present invention is to be filled up with filtering material, it is unnecessary to remove the tab 132 from the notch 131. However, if it is unnecessary to fill up the filter container with filtering material, simply press the tab 132 and remove it from the notch 131. The notch 131 is designed for ventilation thereby making it helpful for the survival of germs.

Figure 5:
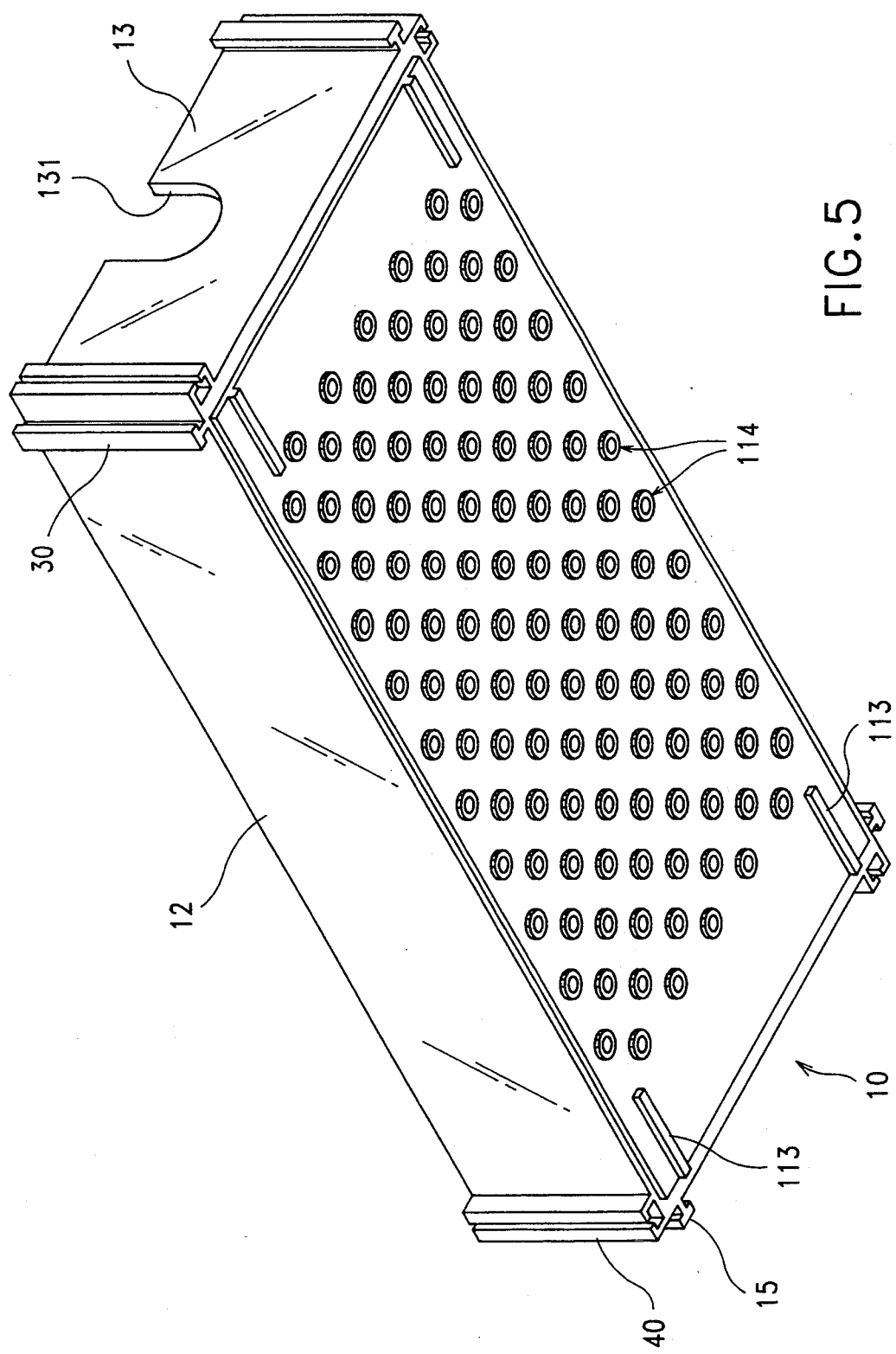
FIG. 5 shows a second preferred embodiment of the present invention.
Figure 6:
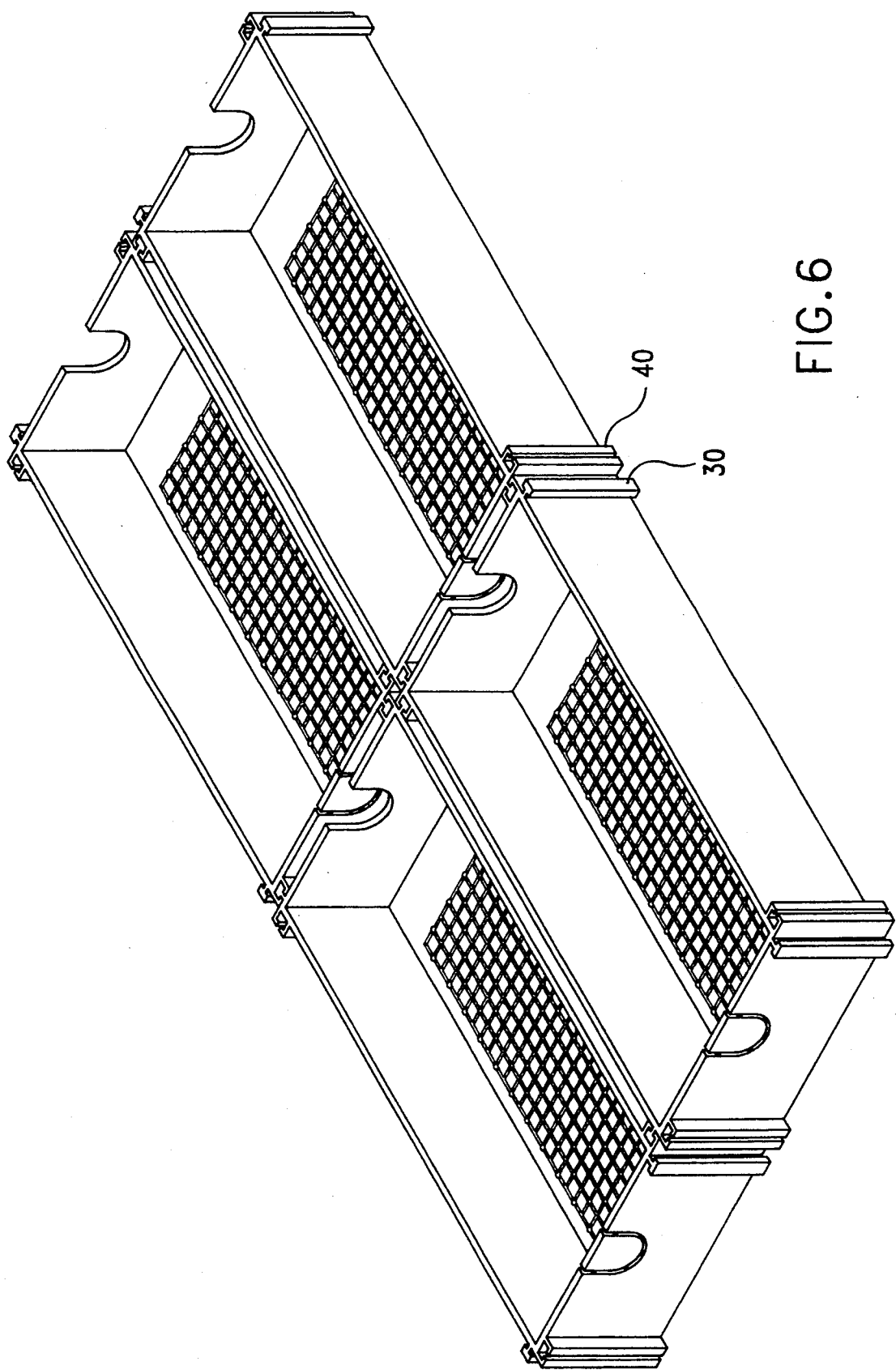
FIG. 6 shows the way to connect a number of additional troughs according to the second preferred embodiment of the present invention.

FIGS. 5 and 6 illustrate another preferred embodiment of the preferred embodiment. As shown, each of the long-side panels 12 and the short-side panels 13 is formed with a dovetail 30 at one end and a dovetail groove 40 at another end so that a plurality of additional trough can be conveniently joined together.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An additional trough for an aquarium filter container comprising a rectangular body having an open top and consisting of a bottom panel, two long-side panels and two short-side panels, said bottom panel being formed with a plurality of equidistant longitudinal and transverse grooves making a plurality of intersecting points, a perforation being formed at alternating intersecting points and equally distant from each other, said bottom panel further having at an outer side a protruded portion which is smaller than the open top of said rectangular body in area and extends outwardly to form a flange and downwardly to form four elongated projections, said bottom panel having an outer side formed with a plurality of annular portions concentric with corresponding perforations.

2. The additional trough for an aquarium filter container as claimed in claim 1, wherein each of said short-side panels is provided at an upper side with a curved notch engaged with a tab which can be easily removed by applying force thereon.

3. The additional trough for an aquarium filter container as claimed in claim 1, wherein each of said long-side panels and short-side panels is formed with a dovetail at one end and a dovetail groove at another end.

4. The additional trough for an aquarium filter container as claimed in claim 1, wherein said bottom panel flange has a diameter of 3 mm and a depth of 0.75 mm.

5. The additional trough for an aquarium filter container as claimed in claim 1, wherein said flange is formed with a plurality of holes.

* * * * *